United States Patent Office

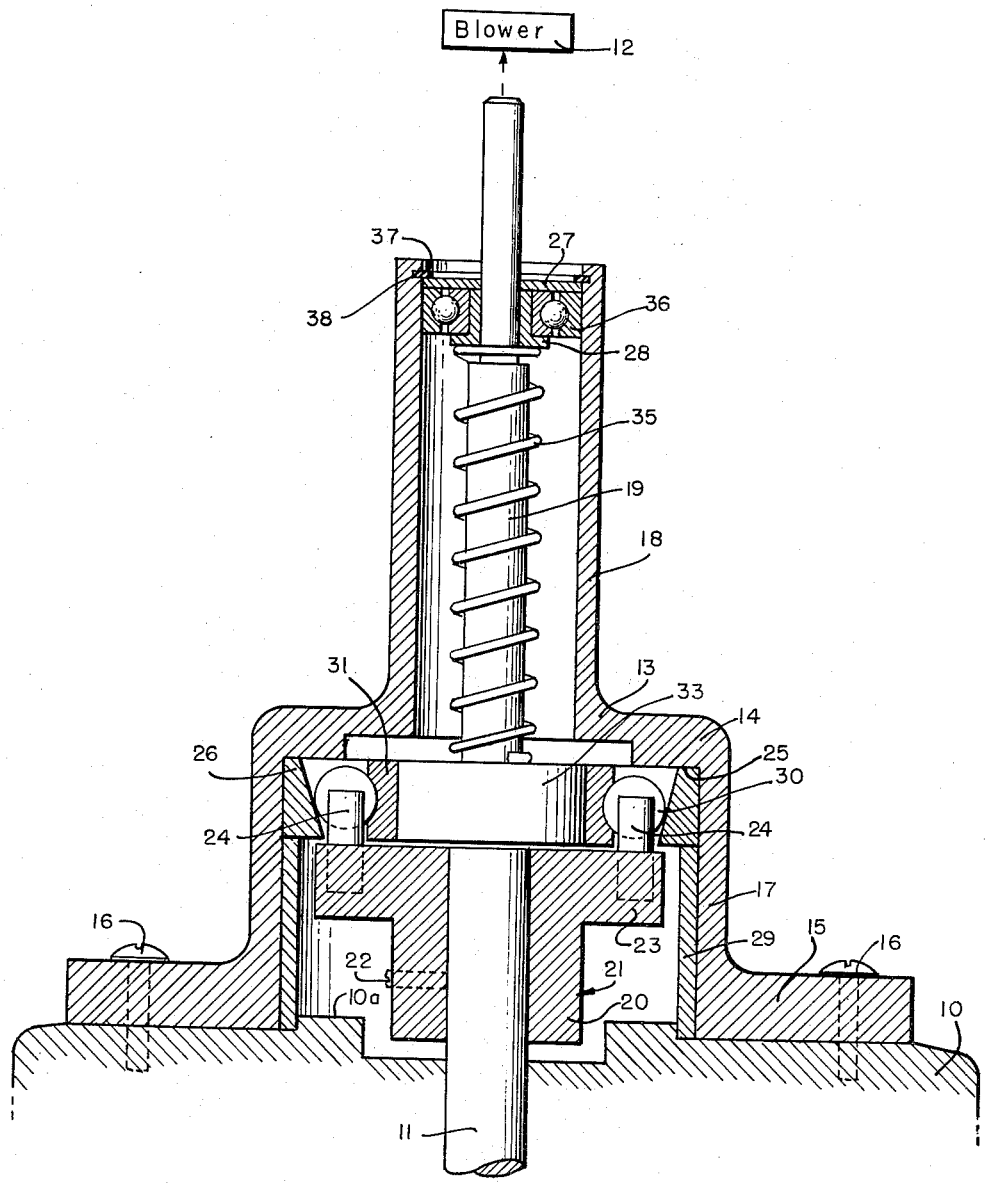

3,001,420
Patented Sept. 26, 1961

3,001,420
BALL PLANETARY DRIVE UNIT
Vern S. Juenke, Reno, Nev., assignor to Nevada Air
Products Co., Reno, Nev.
Filed Sept. 1, 1959, Ser. No. 837,480
5 Claims. (Cl. 74—798)

The present invention relates to an improved drive unit adapted to be employed as a speed changing coupling device, for example between a motor and blower unit; and is more particularly concerned with a drive unit of relatively simple construction which is adapted to obviate known disadvantages of other drive and coupling units suggested heretofore.

As is well known, it is often desired to provide a coupling unit, between a motor and driven member, adapted to effect a speed change; and in general such speed changing devices have taken the form of gear mechanisms. Indeed, conventional planetary drive systems employing gears are well known and have been used for many years. However, it has been found that such units, particularly when they are to be employed in high speed applications, exhibit considerable problems in respect to cost, wear, efficiency, noise and size. It has been suggested that, in order to obviate at least some of these disadvantages, other types of drive units could be utilized; and one particular such drive unit suggested heretofore has comprised a planetary drive mechanism employing balls, e.g. conventional ball bearing elements, in place of gears.

In general, such units include an outer and inner race having balls mounted therebetween, cooperating with a cage or separator. Drive may be applied to said cage, and the outer race of the bearing member may be held in substantially fixed position whereby a driven member coupled to the movable inner race is caused to rotate at a speed other than that of the drive applied to the cage. When this particular arrangement of elements is employed, i.e. drive is applied to the cage and the output is taken from the inner race, a speed increase equal to the outer race diameter plus the inner race diameter, divided by the inner race diameter, is normally effected; and if drive is effected in the opposite direction, i.e. to the inner race, with the output being taken from the cage, a speed reduction of the same ratio may be achieved.

The forms of such ball bearing drive mechanisms suggested heretofore have, notwithstanding their recognition of the aforementioned general principles, been subject to a number of practical difficulties. By way of example, it has been recognized that the various elements comprising an overall drive unit of the type mentioned should preferably comprise different materials. Thus, in order to render the unit fairly lightweight (which is of considerable importance in various installations, e.g. in aircraft), major portions of the unit should be constructed of some lightweight metal such as aluminum. In order to effect good wearing properties, however, the races of the bearing unit described should comprise steel; and accordingly, when both of these materials are to be employed in a practical unit, some special considerations are required to permit variable expansion of the different metals under varying conditions of operation. The present invention directly achieves this purpose; and is to be distinguished from prior art structures wherein the units were necessarily formed of a single metal, e.g. steel, in an attempt to obviate variable expansion problems.

In addition, it has been found that ball bearing coupling units of the types mentioned have in the past ordinarily been designed for use with a given motor of predetermined size and rating wherefore it was difficult, if not impossible, to use a given coupling with various different motors. Indeed, in prior arrangements, the coupling unit often comprised an integral part of the driving motor, and has in fact been housed within the motor housing itself. The foregoing undesirable features, in addition to severely limiting the use which could be made of a given coupling unit, has also necessarily required that much care be taken to assure that the motor shaft, drive unit elements, and output shaft, are in close alignment with one another. In distinction to this, the present invention contemplates a unitary coupling device which may be added to a motor to act as a true coupling element between the motor and some driven member such as a blower; and the coupling unit itself is so arranged and constructed that it may be employed between various different driving and driven structures without any substantial alteration of the coupling itself. In addition, the coupling unit is such that some play is intentionally provided on the interior thereof to avoid the necessity of close alignment between the motor shaft and driven member axis. Indeed, the intentional provision of play within the coupling unit of the present invention, preferably between the balls and cage of the bearing device, compensates for both angular and axial displacements between the driving and driven shafts of an overall installation; and this represents a significant improvement from a practical point of view.

It has been further found that it is often desirable to employ some form of resilient loading, e.g. spring loading, upon the bearing elements of the speed changing unit; and this loading has often been arranged to load the inner race of the bearing. The particular spring loading arrangements suggested heretofore, however, have been such that a thrust bearing is ordinarily required between the spring and the speed changer; and this requirement of an additional thrust bearing has increased the cost of the device, made it more complex structurally, and necessarily increased maintenance problems. The present invention serves to obviate these difficulties by so providing a spring loading arrangement in the speed changing coupling device that the inner race is loaded directly, thereby eliminating all need for auxiliary thrust bearings.

Furthermore, the use of a tapered section on the inside of the outer race utilizes a novel loading feature not found in the prior art. This feature also permits the use of a lighter load spring to achieve a non-slip condition, thereby maintaining a higher degree of efficiency in the drive.

In addition, it has been found that ball bearing speed change coupling devices of types suggested heretofore, have not permitted ready assembly or disassembly. This feature becomes most important, from a practical point of view, since it has necessarily given rise to problems of manufacture, and subsequent maintenance, of the coupling unit. All of these problems are, however, completely obviated by the structure of the present invention.

It is accordingly an object of the present invention to provide an improved coupling arrangement, of the ball bearing planetary drive type, which is lower in cost, smaller in size, and which exhibits better characteristics of wear, efficiency, and noiseless operation, than has been possible heretofore.

A further object of the present invention resides in the provision of a unitary coupling device of improved construction, adapted to be mounted between a conventional drive unit such as a motor and a conventional driven unit such as a blower, thereby to effect speed changes while simultaneously permitting ready disassembly of the parts comprising the overall drive train.

A still further object of the present invention resides in the provision of an improved coupling unit of the ball bearing planetary drive type, comprising an assembly of different materials so arranged that problems of variable expansion of said materials is avoided.

Still another object of the present invention resides in the provision of a coupling unit of the ball bearing planetary drive type which is simpler in construction and more efficient in operation; and in particular, which employs an improved spring loading arrangement.

A further object of the present invention resides in the provision of a speed changing coupling device, which may be assembled and disassembled more readily than has been possible heretofore.

Another object of the present invention resides in the provision of a coupling device having greater versatility than such devices suggested in the past.

In providing for the foregoing objects and advantages, the present invention contemplates the provision of a ball bearing planetary drive unit comprising a housing of unique configuration adapted to receive and retain, in readily removable relation, a ball bearing speed changer, driving and driven shafts, and an improved spring loading device. The housing itself includes flange elements adapted to permit attachment of said unit in a separable configuration to a motor housing; and driving connection to the motor itself is accomplished through a unique separable element which is adapted to be removably attached to the motor shaft, and which includes means acting as the bearing cage or separator.

The bearing elements are in turn removably supported within the aforementioned coupling housing in a novel manner; being held into position, at the time of assembly, by a ring so located and arranged that variable expansion between the bearing race and housing can readily occur without in any way affecting the operation of the speed changer. The driven portion of the coupling unit also comprises, as will become apparent, a novel output hub arrangement cooperating with an output shaft and with said bearing, and having a spring loading element so arranged that loading forces are applied directly, rather than by an auxiliary thrust bearing, to the inner bearing race. The overall assembly thus effected is such that the coupling unit can be employed in any of many diverse applications wherein speed changing is desired; and ready disassembly of the coupling unit from the remaining elements of the drive train can be effected, as can ready disassembly of the internal portions of the coupling unit itself.

Thus, referring to the drawings, it will be seen that, in accordance with the present invention, it may be desired to effect drive from a motor having a housing 10 and an output shaft 11 extending therefrom, to some auxiliary mechanism 12, such as a blower, in such manner that said blower 12 operates at a speed in excess of motor 10. Such an arrangement, providing a speed increase, is particularly to be desired in high speed operations, since it eliminates the necessity of using brush type A.C. motors, which have been considered necessary heretofore when high speeds of operations were necessary; and permits in the alternative the employment (as motor 10, for example) of reliable brushless type motors.

In order to effect this speed increase, a coupling unit generally designated 13 may be provided as a separable mechanism disposed between motor 10 and blower 12; and as will be appreciated from the subsequent discussion, the separable coupling unit 13 can in fact be utilized in conjunction with various diverse motors and with various diverse driven units, thereby to permit a wide interchangeability of these units without at the same time requiring any special design or assembly considerations in regard to the coupling unit itself.

The unitary coupling unit comprises a housing 14, preferably constructed of aluminum, and having an outer substantially circular flange 15 adapted to be seated against the outer face of the housing comprising motor 10, and adapted to be removably secured thereto by means such as bolts 16. Housing 14 includes a first hollow cylindrical portion 17 of relatively wide diameter adapted to receive and retain a number of elements, to be described hereinafter; and said housing 14 further includes, as an integral portion thereof, a further cylindrical member 18 of smaller diameter than portion 17 and adapted to receive an output shaft 19 therein.

In order to effect drive between motor shaft 11 and the coupling unit 13, a drive hub 20 is removably attached to motor shaft 11. This drive hub, as is illustrated in the attached figure, is of T cross-section and includes a cylindrical portion 21 adapted to slidably engage the motor shaft 11 and adapted to be held in position on said motor shaft by a set screw 22. Drive hub 20 further includes an annular flange 23 having a plurality of nylon pins 24 extending therefrom at a plurality of spaced positions adjacent the outermost periphery of said flange 23. The above pins will hereafter be referred to as the cage or separator. The nylon pins 24 are in fact recessed into flange 23, as illustrated in dotted lines, and said flange 23 and cylindrical member 21 forming the drive hub 20, preferably comprise a lightweight metal such as aluminum.

It will be noted that the use of set screw 22 permits hub 20 to be employed in conjunction with motor shafts of various different diameter, within limits; and it will be further appreciated that, for greatest versatility of use, various hubs such as 20, provided respectively with various different diameter internal bores, could be provided. Such an arrangement will permit the overall assembly to be mounted on motors having various diameter output shafts through the simple expedient of selecting a hub 20 of proper internal bore; and none of the other elements of the drive unit need otherwise be changed.

The relatively wide housing portion 17 includes an internal shoulder 25 against which is seated a steel race 26 comprising the outer race of the speed changing bearing.

In order to hold the outer race 26 in place against interior shoulder 25, an aluminum ring 29 is provided which bears on its lower end against the housing of motor 10 and an aligning projection 10a thereon; and which bears on its upper surface against the outer race 26, locking said race from rotating. Ring 29 exhibits a relatively loose fit with respect to the internal walls of coupling portion 17 whereby, when the coupling unit is removed from the motor housing, ring 29 and thereafter outer race 26 can be removed readily from the interior of said portion 17. It will be appreciated from the drawing, however, that the axial length of ring portion 29 is so chosen that when the parts are assembled, as illustrated, substantially no axial movement of outer race 26 can occur, due to the restraining influence at ring 29. The arrangement thus far described, therefore, is one wherein assembly and mounting of the unit causes the several internal parts of the unit to be held fixedly in a desired position; which permits this to be accomplished even when different metals are employed for the various races, rings, and housing portions; and which nevertheless permits all of the parts to be readily disassembled through the simple expedient of disattaching the coupling unit from a motor drive.

A plurality of bearing balls 30 are disposed, as illustrated, between outer race 26 and an inner race 31, also constructed of steel; and these balls 30 are separated from one another by the nylon pins 24 mounted on the radial flange 23 of hub 20. The actual disposition of the balls 30 with regard to nylon pins 24 is preferably such that some play can occur therebetween, whereby once the coupling unit shown in the drawings is mounted between a motor such as 10 and a driven member such as 12, an initial shifting of relative position between balls 30 and pins 24 can occur, to take up any shaft misalignment which may be present between motor shaft 11 and the shaft of a driven member 12. In this regard, it should be noted, for example, that shaft 11 and the output shaft 19 mentioned previously, need not be in precise axial alignment with one another; and indeed, some misalignment may well occur without otherwise affecting the operation of the overall drive. This express provision for axial misalignment reduces, as mentioned previously, tolerance problems in the manufacture and assembly of an overall driving train, and represents a significant improvement from a production point of view over structures suggested heretofore.

In order to take drive from the unit, an output hub 33 is provided which is, as illustrated, press-fitted at 34 to the aforementioned inner race 31. In order to effect drive to output shaft 19, an elongated helical spring 35 is provided which is disposed in surrounding relation to shaft 19 and which bears at its lower surface directly upon the output hub 33, thereby applying pressure between bearing balls 30 and inclined race 26. The uppermost portion of spring 35 (as viewed in the drawing) is in turn held in place by a nylon sleeve 28 which seats on the inner race of a sealed bearing 36, through which a reduced diameter portion of output shaft 19 passes, as illustrated; and a snap ring 37, fitting within annular recesses 38 provided at the outermost end of coupling housing portion 18, holds the overall assembly in place. Between snap ring 37 and bearing 36 rests a Teflon moisture seal 27.

It will be noted that, by the arrangement thus illustrated, spring loading is provided by spring member 35 directly onto the inner race 31 of the bearing unit 26—30—31, without the need of any auxiliary thrust bearings.

The output shaft 19, as illustrated, extends outwardly from the uppermost end of coupling housing portion 18, wherefore it may be attached to a driven member 12 by any desired means. In this regard, it should be noted that, as a practical matter, the driven member 12 may comprise various appliances or transmissions other than blower units of the types mentioned; and indeed the overall arrangement can be employed in any application wherein speed changing is desired.

It should be noted that by reason of the arrangement described above, the coupling unit 13 cannot only be employed in conjunction with various motors and various driven units, and can not only be readily disassembled from such units, but can in fact be readily assembled and disassembled on the interior thereof. From a maintenance point of view, when such maintenance is required, this permits the ready substitution or replacement of parts in a relatively short time; and although the overall arrangement is such that maintenance requirements are reduced to a minimum, the features thus described are nevertheless of considerable advantage since maintenance, when it must occur, can be effected in a much simpler and less expensive manner than has been possible in any arrangement suggested heretofore.

While I have thus described a preferred embodiment of the present invention, many variations will be suggested to those skilled in the art, and all such variations and modifications as are in accord with the principles described are meant to fall within the scope of the appended claims.

I claim:
1. In a single ratio speed changing mechanism of the type comprising a hollow substantially cylindrical housing having inner and outer bearing races therein at a position between the ends of said housing, said bearing races having bearings therebetween separated from one another by a cage, and said mechanism having a first rotatable shaft in said housing attached to said cage as well as a second rotatable shaft in said housing attached to said inner race and disposed substantially in alignment with said first shaft, the improvement which comprises a hollow cylindrical ring slidably disposed in said housing in surrounding relation to said first shaft, said ring having outer walls of lesser diameter than and extending parallel to the inner walls of said housing, and said ring extending from a position adjacent one end of said housing to and into engagement with one end of said outer race, the outer diameter of said outer race being less than the inner diameter of said housing whereby said outer race is normally slidable within said housing, being retained in spaced relation to said one end of said housing substantially solely by forces exerted on said outer race by said ring, and a spring surrounding said second shaft and rotatable therewith, one end of said rotatable spring being held against axial movement adjacent the other end of said housing, and the other end of said rotatable spring applying a resilient force urging said inner race and bearings toward said outer race against the restraint of said ring.

2. The mechanism of claim 1 including an output bearing adjacent said other end of said housing, said one end of said spring being held against said axial movement adjacent said other end of said housing by said output bearing.

3. The mechanism of claim 2 including a non-metallic sleeve surrounding said second shaft and disposed between said output bearing and said one end of said spring.

4. The mechanism of claim 1 wherein said cage comprises a metallic drive hub removably attached to said first shaft and having a plurality of non-metallic cylindrical drive pins extending therefrom at positions between said bearings respectively.

5. The mechanism of claim 1 wherein said housing includes abutment means adjacent the other end of said outer race for limiting movement of said normally slidable outer race toward said other end of said housing.

References Cited in the file of this patent

UNITED STATES PATENTS

| | | |
|---|---|---|
| 1,490,340 | Nielson | Apr. 15, 1924 |
| 2,005,949 | Morgan | June 25, 1935 |

FOREIGN PATENTS

| | | |
|---|---|---|
| 755,427 | France | Sept. 11, 1933 |

OTHER REFERENCES

Zytel Nylon Resin by Dupont Poly-Chemicals Dept. dated Sept. 26, 1957.

Designing Fabricated Nylon Parts by R.B. Zimmer v. "Machine Design" pp. 153–159, March 1954.